(12) United States Patent
Triquet (10) Patent No.: US 12,416,172 B2
(45) Date of Patent: Sep. 16, 2025

(54) WATER DISTRIBUTION DEVICE FOR MAINTENANCE OF AN ARTIFICIAL BASIN

(71) Applicant: Eric Triquet, Rumilly (FR)

(72) Inventor: Eric Triquet, Rumilly (FR)

( * ) Notice: Subject to any disclaimer, the term of this patent is extended or adjusted under 35 U.S.C. 154(b) by 403 days.

(21) Appl. No.: 18/116,489

(22) Filed: Mar. 2, 2023

(65) Prior Publication Data

US 2023/0287699 A1 Sep. 14, 2023

(30) Foreign Application Priority Data

Mar. 9, 2022 (FR) ...................................... 2202055

(51) Int. Cl.
*E04H 4/12* (2006.01)
*C02F 1/00* (2023.01)
*C02F 103/42* (2006.01)

(52) U.S. Cl.
CPC ............ *E04H 4/1218* (2013.01); *C02F 1/004* (2013.01); *C02F 1/006* (2013.01); *C02F 1/008* (2013.01); *E04H 4/1245* (2013.01); *C02F 2103/42* (2013.01); *C02F 2201/005* (2013.01); *C02F 2209/006* (2013.01); *C02F 2209/008* (2013.01); *C02F 2209/44* (2013.01); *C02F 2301/043* (2013.01); *C02F 2303/14* (2013.01); *C02F 2303/16* (2013.01)

(58) Field of Classification Search
CPC ....... E04H 4/1218; E04H 4/1245; E04H 4/12; E04H 4/1209; C02F 1/004; C02F 1/006; C02F 1/008; C02F 2103/42; C02F 2201/005; C02F 2209/006; C02F 2209/008; C02F 2209/44; C02F 2301/043; C02F 2303/14; C02F 2303/16
USPC ......................................................... 210/138
See application file for complete search history.

(56) References Cited

FOREIGN PATENT DOCUMENTS

| CN | 202227731 U | 5/2012 |
|---|---|---|
| EP | 3421690 A1 | 1/2019 |
| FR | 2981383 A1 | 4/2013 |
| WO | WO-2014064302 A1 | 5/2014 |
| WO | WO-2021255318 A1 | 12/2021 |

OTHER PUBLICATIONS

French Preliminary Search Report for corresponding French Application No. 2202055 dated Oct. 20, 2022 (2 pages).

*Primary Examiner* — Ekandra S. Miller-Cruz
(74) *Attorney, Agent, or Firm* — Harris Beach Murtha Cullina PLLC (57) ABSTRACT

A water distribution device for simplified and partially automated maintenance of an artificial basin having a water inlet connected to a pump circulating water from the basin through a parallel configuration of pipes, connectors, servo-valves, a filter, a pump and a control unit. The control unit actuates the servo-valves to selectively pumping the water from the basin in a first flow direction through the filter in a filtering mode, from basin in a second flow direction through the filter in a filter washing mode, and from the basin through the piping without passing through the filter in a recirculation mode.

8 Claims, 5 Drawing Sheets

WATER DISTRIBUTION DEVICE FOR MAINTENANCE OF AN ARTIFICIAL BASIN

CROSS-REFERENCE TO RELATED APPLICATIONS

This application claims priority to French Application No. 2202055 filed on Mar. 9, 2022, which is incorporated herein by reference in its entirety.

TECHNICAL FIELD OF THE INVENTION

The present invention relates to the general field of pools, in particular private pools. More particularly, the invention relates to the field of maintenance of pools: filtering, flow and discharge of their water.

PRIOR ART

Pools require a continuous maintenance, in order to maintain the quality of their water and avoid the proliferation of organisms degrading said quality of the water. This maintenance deters some people from the acquisition of a pool.

In particular, for this maintenance, pumps and filters are used. In these systems, a pump sucks in water and makes it flow in the filter. The filter extracts the microorganisms and other particles, which accumulate at the inlet of the latter. Afterwards, the filtered water is redirected towards the basin.

In general, pool filters are washable filters: by making water flow in the direction opposite to that of water filtering, the particles accumulated in the filter are extracted and removes by the water flowing in the reverse direction. The filter is then reusable.

The water of the pool should also be able to be recirculated on a regular basis in order to avoid stagnation and especially when a punctual addition of chlorine ("chlorine shock"), in particular in the form of granules of sodium dichloroisocyanurate, is performed. A problem encountered in the case of private pools is that chlorine (in the form of hypochlorate ion) is retained by the filter. Hence, it is necessary to provide for bypassing the filter.

Water should further be able to be discharged into sewers, after washing the filter and for draining or drying the pool.

These different operations multiply the water pipes and the valves to be actuated to toggle between said pipes. This makes the management of the maintenance complicated for the users of pools with no specific knowledges of the field.

Public pools, with a larger basin, use for the maintenance of their water systems operating continuously: a pump sucks in water continuously, filtering is performed on this sucked water, as well as other operations such as an ultraviolet radiation disinfection, addition of chlorine (in particular by bubbling gaseous dichlorine), water heating, etc.

Large basins of several thousand cubic meters, as well as the large buildings of public pools justify the building of large water treatment units, comprising all of the water maintenance pipes and systems. These units are in the form of dedicated premises, housing all systems.

Specialists set and adjust the different subsystems of these units according to the size of the basin, the number of users, the temperature, etc., and perform the routine operations on said unit such as the replacement of gaseous chlorine gas cylinders, the increase or the reduction of the flow rate of the pumps or of the chlorine bubbler, etc.

However, an individual having acquired a small-size pool cannot necessarily dedicate an entire premise for the automated maintenance of his pool, nor could he resort to a specialist in pool maintenance. Such premises would represent an excess cost and a loss in the parcel surface area. Because of the considerable water volumes and the intensive and continuous use of basins, the continuous operation of the water treatment systems, at least while said basins are used, is justified despite the costs it generates in the case of a public pool.

However, in the case of a private pool, used intermittently and with a lesser intensity, the continuous operation is not economically justified.

In particular, for private pools, there are monolithic valves called multi-way and in particular "six-way" valves which include a multi-position selector, each position corresponding to a particular operating mode (filtering, filter washing, draining, etc.).

These valves pose a high risk of leakage over time, because of a complex selector with movable sealing parts. Furthermore, their monolithic nature implies that they should be replaced in their entirety in the event of failure of one element.

Thus, there is a need for a system for treating the pool water which is compact and easy to use. In particular, said system should be able to be used by users without any particular prior knowledge.

The documents CN202227731 and WO2014/064302 describe devices with valves for the management of the maintenance of an artificial basin, but they have a limited and insufficient number of functions, in particular to enable the injection of chlorine in the water.

BRIEF DESCRIPTION OF THE INVENTION

In order to address this need, the invention provides a water distribution device for maintenance of a basin, in particular an artificial basin, comprising:
  a water inlet configured to be connected to a pump pumping water from the basin,
  first and second pipes, in parallel to one another and connected to the water inlet at one end, the first pipe being configured to be connected to a water discharge at the other end, and the second pipe being configured to be connected to a backflow leading into the basin, characterized in that it includes:
  two connectors for a filter, configured to be connected to a filter filtering the water of the basin when water flows through said filter in a filtering direction and the flow of the water in the reverse direction causing rinsing of the filter, a first connector forming a filter inlet being disposed on the first pipe, between the water inlet and the water discharge, and a second connector forming a filter outlet being disposed on the second pipe, between the water inlet and the backflow,
  servovalves, and a control unit configured to actuate said valves and, by actuating the valves, making water pumped from the basin pass:
  from the water inlet to the connector of the first pipe, and from the connector of the second pipe towards the backflow in a filtering mode,
  from the water inlet to the filter connector of the second pipe, and from the connector towards the water discharge in a washing mode,
  from the water inlet to the backflow without passing through the filter in a recirculation mode. This device enables a simplified and at least partially automated maintenance. The control unit managing the open or closed state of the valves, a wrong and potentially dangerous actuation is avoided. The different elements, pipes, valves, etc., could further be interchanged separately.

The device further includes a pipe bypassing the filter, which connects the first and second pipes in parallel with the filter, and:
- a first valve between the water inlet and the filter connector of the first pipe,
- a second valve between the filter connector of the first pipe and the pipe bypassing the filter,
- a third valve between the water inlet and the filter connector of the second pipe,
- a fourth valve at the filter connector of the second pipe,
- a fifth valve at the pipe bypassing the filter,
- a sixth valve on the second pipe between the pipe bypassing the filter and the backflow.

In particular, the backflow mode is indicated when adding chlorine, which is not retained by the filter which is bypassed.

The device may further have one or more of the following feature(s).

The control unit is then advantageously configured to make, by actuating the valves, water pumped from the artificial basin pass from the water inlet to the filter connector of the first pipe, and from the filter connector of the second pipe towards the water discharge in a rinsing mode.

This rinsing mode allows discharging the particles coming out of the filter upon return into the filtering mode after washing the filter.

The control unit may be connected to a terminal having an interface, including at least one switch, the actuation of which causes toggling between different operating modes.

The control unit may be connected to an antenna, configured to connect the control unit and the terminal, on which the switch is disposed.

The control unit may further be connected to a clock, and be programmable to automatically toggle between different operating modes at predetermined time points.

The control unit may be configured to toggle between an automatic mode, in which toggling between different operating modes is automatic at predetermined time points, and a manual operating mode, in which toggling between different operating modes is managed by the actuation of the switch by the user.

The control unit may be configured to execute toggle cycles between the different operating modes, with:
- an operation in the filtering mode for a first time period, then
- an operation in the washing mode for a second time period.

The control unit may be configured to execute cycles further including an operation in the rinsing mode for a third time period after operation in the washing mode for a second time period.

BRIEF DESCRIPTION OF THE FIGURES

Other advantages and features will appear upon reading the following description of the figures, among which.

The embodiments shown in the figures and described hereinafter are given as a descriptive and non-limiting example. Other embodiments may be obtained by slightly modifying the features of the described embodiments or by combining features of different embodiments whenever this is possible.

DETAILED DESCRIPTION OF THE FIGURES

Figure 1:
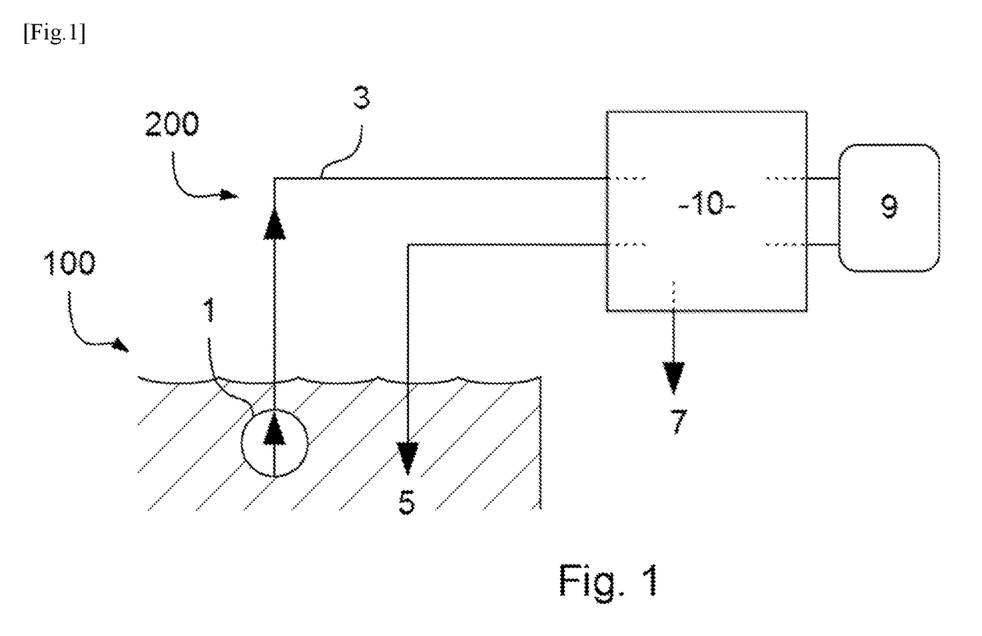
FIG. 1 is a schematic representation of a basin with a water maintenance device.

FIG. 1 is a schematic representation of a basin 100 with a water maintenance device 200. In particular, the basin 100 is an artificial basin, for example a swimming, Jacuzzi pool, or the like.

In particular, the water maintenance device 200 includes: a pump 1 and a water distribution device 10, the pump 1 being connected to a water inlet 3 of said water distribution device 10.

For example, the pump 1 is integrated to a maintenance robot, which covers the bottom of the basin, possibly equipped with rotary brushes. Alternatively, the pump 1 may be remote, and be located, for example, in dedicated premises which contain the rest of the water maintenance device 200, if such premises are available.

The water distribution device 10 is connected to a backflow 5, leading into the basin 100, and to a water discharge 7, leading for example into a connection to the sewers or to a rainwater drainage discharge.

A filter 9 is connected to the water distribution device 10 by two filter connectors 11, 13.

In particular, the filter 9 is a reversible or washable filter. These filters are designed so as to filter water when it crosses them in one direction, in the filtering direction, and to be washed by said water when it crosses them in the other direction, in the washing direction. For example, sand filters are such washable filters: in their filtering direction, the particles (and part of the solutes) are retained by the sand, and in their washing direction, the water removes the particles retained before in the filtering mode.

Figure 2:
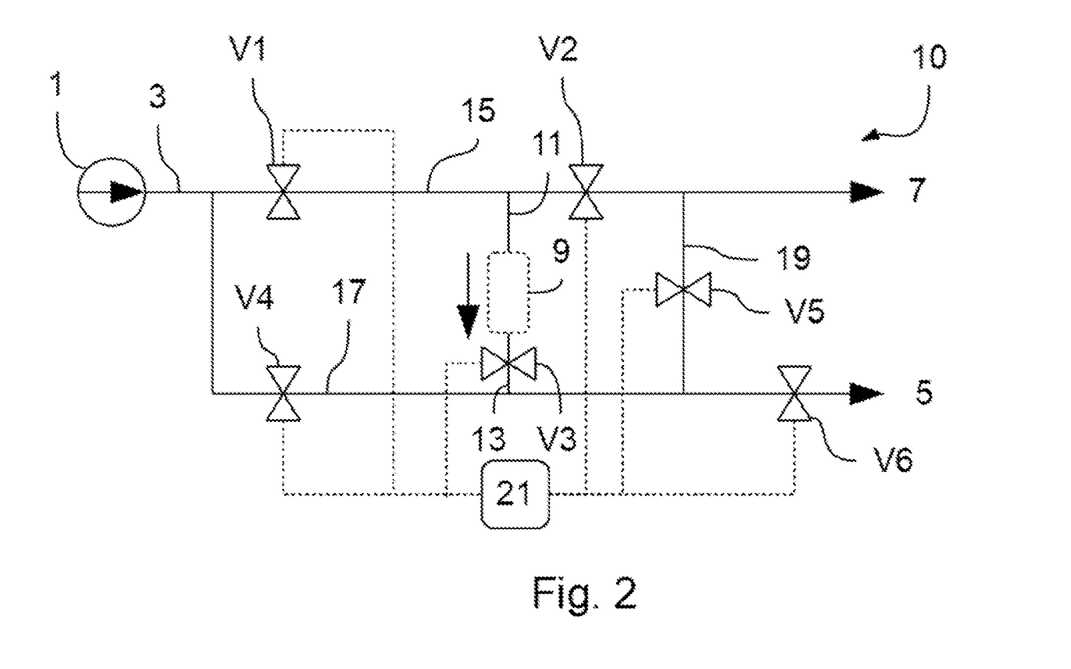
FIG. 2 is a schematic representation of a first embodiment of a water distribution device for the water maintenance device of FIG. 1.

A first embodiment of the water distribution device 10 is shown in more detail in FIG. 2.

The water distribution device 10 includes a first pipe 15 and a second pipe 17, in parallel with one another and connected to the water inlet 3, and therefore to the pump 1, at one end. The first pipe 15 is configured to be connected to the water discharge 7 at the end opposite to the water inlet 3. The second pipe 17 is configured to be connected to the discharge 5.

A pipe 19 bypassing the filter 9 connects the first and second pipes 15, 17 in parallel with the filter 9.

The first filter connector 11, forming an inlet of the filter 9, is disposed on the first pipe 15, between the water inlet 3 and the discharge 5, and the second filter connector 13, forming an outlet of the filter 9, is disposed on the second pipe 17, between the water inlet 3 and the discharge 5.

When the filter 9 is connected to the filter connectors 11, 13 and properly oriented, water entering through the inlet of the filter 9 comes out filtered through the outlet of the filter 9. In the reverse direction, water entering through the outlet of the filter 9 comes out loaded with the previously-filtered particles through the inlet of the filter 9.

An arrow indicates in FIG. 2 the flow direction of water resulting in filtering: from the connector 11 of the first pipe 15 (which is therefore the filter inlet 9) to the connector 13 of the second pipe 17 (which is therefore the filter outlet 9).

A flow in the direction opposite to the filtering direction results in washing the filter 9 while removing part of the previously-filtered particles.

The water distribution device 10 includes servovalves V1, V2, V3, V4, V5, V6, and a control unit 21 configured to actuate said valves V1 to V6.

In particular, the control unit 21 includes an electronic memory and computer means, such as a processor. For example, the control unit 21 drives the valves V1 to V6 by means of electronic actuators such as transistors.

The control unit 21 may be a dedicated box, or be integrated into a control circuit of the devices of the basin 100, further controlling other systems of the basin (lighting, shutter for closing the basin 100, pump 1, etc.).

For example, the valves V1 to V6 are solenoid valves, and the actuation of the valves V1 to V6 makes them toggle between an open state, where water could cross the considered valve V1 to V6, into a closed state, where the valve V1 to V6 stops the water flow.

By actuating the valves V1 to V6, the control unit 21 selectively directs the water pumped from the basin 100:
- from the water inlet 3 to the filter connector 11 of the first pipe 15, and from the filter connector 13 of the second pipe 17 towards the backflow 5 in a filtering mode,
- from the water inlet 3 to the filter outlet 13 through the second pipe 17, and from the filter inlet 11 towards the discharge 7 in a washing mode,
- from the water inlet 3 to the backflow 5 without passing through the filter 9 in a recirculation mode,
- from the water inlet 3 to the filter connector 11 of the first pipe 15, and from the filter connector 13 of the second pipe 17 towards the water discharge 7 via the pipe bypassing the filter 19 in a rinsing mode.

The presence of the three filtering, washing and recirculation operating modes enables the management of a private basin with a moderate size, in an at least partially automated manner: the filtering mode is adopted to keep water limpid, and the washing mode enables maintenance of the filter 9. The recirculation mode enables the user to add chlorine in the form of granules or liquid, while avoiding the filter 9 absorbing the added chlorine.

To be able to toggle between these different modes, the valves V1 to V6 are disposed in particular as follows on the water distribution device 10.

A first valve V1 is disposed on the first pipe 15 between the water inlet 3 and the filter connector 11 of the first pipe 15.

A second valve V2 is disposed between the filter connector 11 of the first pipe 15 and the pipe bypassing the filter 19.

A third valve V3 is disposed on the filter connector 13 of the second pipe 17.

A fourth valve V4 is disposed between the water inlet 3 and the filter connector 13 of the second pipe 17.

A fifth valve V5 located at the pipe bypassing the filter 19.

A sixth valve V6 located on the second pipe 17 between the pipe bypassing the filter 19 and the discharge 5.

To direct the water of the basin 100 in the filtering mode from the water inlet 3 to the discharge 5 throughout the filter 9, the control unit 21 toggles the states of the valves V1 to V6 so that the first valve V1 is open, the second valve V2 is closed, but water does not actually reach it, the third valve V3 is open, the fourth valve V4 is closed, the fifth valve V5 is closed, and the sixth valve V6 is open.

To direct the water of the basin 100 in the recirculation mode, from the water inlet 3 to the discharge 5 without passing through the filter 9, the control unit 21 toggles the states of the valves V1 to V6 so that the first valve V1 is closed, the second valve V2 is closed, the third valve V3 is closed, the fourth valve V4 is open, the fifth valve V5 is closed, and the sixth valve V6 is open. The recirculation mode is indicated in particular when the user performs a punctual addition of chlorine, directly in the basin 100 in the form of dichloroisocyanurate, which should not, or barely, be stopped by the filter 9.

To direct the water of the basin 100 in the washing mode from the water inlet 3 to the discharge 5 while washing the filter 9, the control unit 21 toggles the states of the valves V1 to V6 so that the first valve V1 is closed, the second valve V2 is open, the third valve V3 is open, the fourth valve V4 is open, the fifth valve V5 is closed, and the sixth valve V6 is closed.

The washing mode is to be used temporarily and briefly to regenerate the filter 9, in which the filtered particles accumulate.

To direct the water of the basin 100 in a rinsing mode from the water inlet 3 to the discharge 5 throughout the filter 9 in the filtering direction, the control unit 21 toggles the states of the valves V1 to V6 so that the first valve V1 is open, the second valve V2 is closed, the third valve V3 is open, the fourth valve V4 is closed, the fifth valve V5 is open, and the sixth valve V6 is closed. The rinsing mode is to be used briefly after operation in the washing mode. Indeed, washing results in mixing the sand or the filtering load of the filter 9 and the previously filtered particles.

Upon return into the filtering mode, in the absence of an intermediate step of operation in the rinsing mode, the filtered particles close to the outlet of the filter 9 will be conveyed and driven in the basin 100 by the first liters of water coming out of the filter 9.

By using the rinsing mode briefly after operation in the washing mode, the water coming out of the filter 9 and loaded with previously filtered particles is discharged.

To direct the water of the basin 100 in a drain mode from the water inlet 3 to the discharge 5 without passing through the filter 9, the control unit 21 toggles the states of the valves V1 to V6 so that the first valve V1 is open, the second valve V2 is open, the third valve V3 is closed, the fourth valve V4 is closed, the fifth valve V5 is closed, and the sixth valve V6 is closed. In the drain mode, the water of the basin 100 is directed towards the water discharge 7 without passing through the filter 9. This drain mode allows draining the basin 100, partially or totally, in order to prepare it for winter or to fill it afterwards with fresh water.

According to particular embodiments, draining the basin 100 may be performed at least partially by adopting a washing or rinsing operating mode, throughout the filter 9 either in the washing (washing mode) or filtering (rinsing mode) direction. In these operating modes, the water is directed towards the discharge 5.

Other operating modes are also possible: a closed mode, in which all valves V1 to V6 are closed, and a drying mode, in which all valves V1 to V6 are open. For example, the closed mode is adopted in winter or when it is provided not to use the basin 100 for a prolonged time period. Before switching in the closed mode and after draining the basin 100, the drying mode allows avoiding water remaining in a section of the pipes 15, 17, which water, when freezing, could damage the water distribution device 10.

Figure 3:
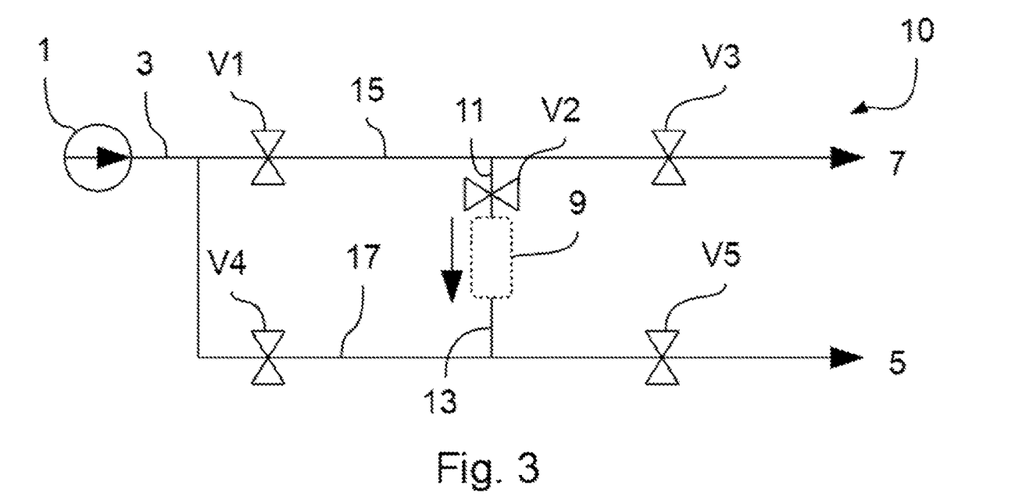
FIG. 3 is a schematic representation of a second embodiment of a water distribution device for the water maintenance device of FIG. 1.

FIG. 3 shows an alternative embodiment of the water distribution device 10, indicated in particular for small-size basins (total volume typically smaller than 30 cubic meters) using a small-size filter 9.

The control unit 21 and the connections of the latter with the valves V1 to V5 are not represented in FIG. 3, but are nonetheless present like in FIG. 2.

This water distribution device 10 differs from that of FIG. 2 in that it does not include a pipe bypassing the filter 19, and by the number and arrangement of its valves V1 to V5, five in number instead of six.

A first valve V1 is disposed on the first pipe 15 between the water inlet 3 and the filter connector 11 of the first pipe 15.

A second valve V2 is disposed on the filter connector 11 of the first pipe 15.

A third valve V3 is disposed between the filter connector 11 of the first pipe 15 and the water discharge 7.

A fourth valve V4 is disposed between the water inlet 3 and the filter connector 13 of the second pipe 17.

A fifth valve V5 located between the filter connector 13 of the second pipe 17 and the backflow 5.

To direct the water of the basin 100 in the filtering mode from the water inlet 3 to the discharge 5 throughout the filter 9, the control unit 21 toggles the states of the valves V1 to V5 so that the first valve V1 is open, the second valve V2 is open, the third valve V3 is closed, the fourth valve V4 is open and the fifth valve V5 is open.

To direct the water of the basin 100 in the recirculation mode, from the water inlet 3 to the discharge 5 without passing through the filter 9, the control unit 21 toggles the states of the valves V1 to V6 so that the first valve V1 is closed, the second valve V2 is open, the third valve V3 is open, the fourth valve V4 is open and the fifth valve V5 is closed.

To direct the water of the basin 100 in the washing mode from the water inlet 3 to the discharge 5 while washing the filter 9, the control unit 21 toggles the states of the valves V1 to V6 so that the first valve V1 is closed, the second valve V2 is open, the third valve V3 is open, the fourth valve V4 is open and the fifth valve V5 is closed.

The embodiment of FIG. 3 does not enable a rinsing mode, in which water is injected into the filter 9 in the filtering direction, and then directed towards the water discharge 7.

In particular, the rinsing mode is useless for small-size basins 100, for which a small-size filter 9 is used, which filter 9 contains only a small amount of filtered particles after washing.

Also, by doing without the rinsing mode, the embodiment of FIG. 3 allows reducing the number of valves V1 to V5, and thus reducing the bulk and the cost of the water distribution device 10.

More than before, the size and the capacity of the control unit 21 could be reduced, thanks to the reduced number of valves V1 to V5, with less lines linking the control unit 21 to the valves V1 to V5.

The management of the washing cycles of the filter 9 is also simplified.

Figure 4:
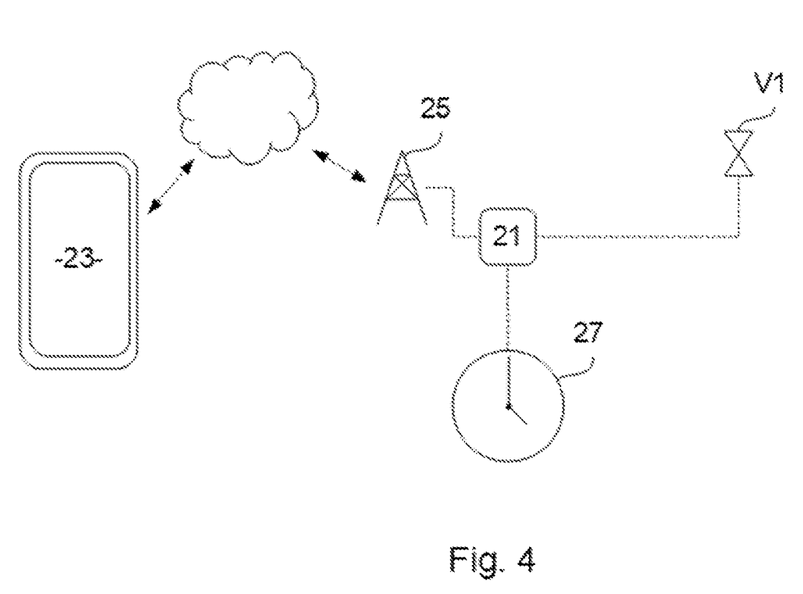
FIG. 4 is a schematic representation of a control unit for the device of FIGS. 2 and 3, with different elements connected to said control unit.

FIG. 4 shows in more detail the control unit 21 and different elements to which it is connected. The control unit 21 is shown connected to a valve V1 whose open or closed state is controlled thereby. For clarity, the other valves V2 to V6 or V2 to V5 are not represented.

In particular, the control unit 21 is connected to a terminal 23, which forms an interface with the user displaying one or more virtual switch(es) with which the user interacts.

For example, the terminal 23 is herein a telephone, on which a corresponding application is installed. Alternatively, the terminal 23 may be a simple box provided with switches with which the user interacts.

In particular, the control unit 21 is connected to an antenna 25, for example a Wi-Fi or Bluetooth emitter, which connects the control unit 21 to the terminal 23 carrying the interface.

The control unit 21 is also connected to a clock 27, possibly integrated into the control unit 21 in the form of an integrated circuit.

According to the represented embodiment, the antenna 21 is a Wifi adapter, which is connected to the Internet (represented by a cloud). The terminal 23 is then a phone or a connected appliance, on which a dedicated management application is installed.

The control unit 21 is then advantageously programmable so as to automatically toggle between different operating modes at predetermined time points, selected by the user.

The control unit 21 may then toggle between an automatic mode, in which toggling between different operating modes is automatic and at predetermined time points, and a manual operating mode, in which toggling between different operating modes is managed by the actuation of the switch.

Figure 5:
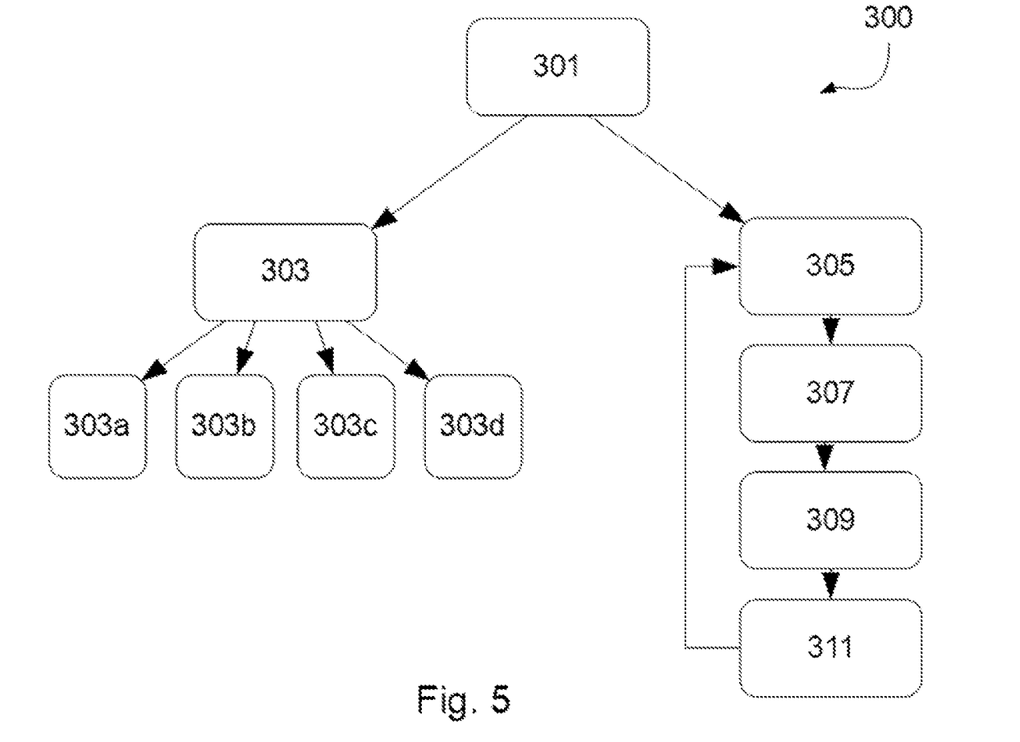
FIG. 5 is a flowchart illustrating the operation of the water distribution device of FIGS. 2 and 3.

FIG. 5 illustrates such an operation in the form of a flowchart.

The method 300 for managing the maintenance device 200 begins with a step 301 of prior selection by the user of the manual or automatic mode.

If the user selects the manual mode, a step 303 of manual selection of the operating mode follows, in which the accessible operating modes are proposed to the user: filtering, recirculation, washing, rinsing, etc.

The user then selects during a selection step amongst the accessible operating modes 303a, 303b, 303c, 303d.

In particular, it is provided for the user being able to select a "chlorine shock" operating mode in which the control unit 21 toggles the water distribution device 10 into the recirculation mode for at least one predetermined time period, and possibly until the user manually toggles into another operating mode. The "chlorine shock" mode is then engaged by the user when he adds chlorine in the water of the basin, in particular in a soluble form such as sodium dichloroisocyanurate. Thus, the user toggles between the different proposed modes according to the needs he considers suitable for the maintenance of his basin 100.

If the user selects the automatic mode, the control unit 21 then takes care of toggling between the different operating modes of the maintenance device 200, in particular by executing cycles of toggling between the different operating modes, with:

an operation in the filtering mode 305 for a first time period, then an operation in the washing mode 307 for a second time period, an operation in the rinsing mode 309, if the water distribution device 10 allows doing so for a third time period.

Possibly, the control unit 21 may further toggle, after operation in the washing 307, or rinsing 309 mode when present, into the recirculation mode 311 for a fourth time period, before returning back into the filtering mode 305 and therefore restarting the cycle again.

These filtering 305, washing 307 and then rinsing 309 cycles correspond to the procedure of using (filtering 305) and maintaining the filter 9 (washing 307 and then rinsing 309). Said cycles are automatically executed, and the durations of the different operating modes can be optimized according to criteria such as the volume of the basin 100, the temperature and the chemistry of the water of the basin 100, the intensity of use of the basin 100, the pressure in the filter 9, the level of tanks of products for maintaining the pool 100 (chlorine precursor, pH regulators, etc.), the outside temperature, etc.

For this purpose, the control unit 21 may be connected to corresponding sensors such as thermometers, conductivity sensors, pH and redox probes, absorbance sensors, etc., to optimize the durations of the operating modes for example according to tables stored in an electronic memory of the control unit 21.

By sensing the pressure in the filter 9, the control unit 21 may allow avoiding damaging the maintenance device 200, as the control unit 21 could cut off the pump 3 as soon as a pressure threshold is reached in the filter 9, before break-up of the connectors 11, 13 or of one or more valve(s) V1 to V6: or alternatively toggle into the washing mode while sending, or not, an alert to the user.

Additional embodiments could be derived directly from the previously-described ones by connecting the control unit 21 to additional devices such that:
- a water intake injecting water in the basin 100, from a utility network or a tank, and whose flow rate is controlled by the control unit 21,
- a shutter selectively closing the basin 100,
- lights,
- massage or ornamental nozzles (artificial waterfall, fountain, etc.),
- a salt electrolyzer, supplying the hypochlorate ions,
- a vacuum cleaner or cleaning robot,
- an alarm warning in the event of a fall, for example of a child, in the basin,
- a surveillance camera,
- pumps injecting maintenance products from tanks.

In particular, the control unit 21 can match the filtering, washing, rinsing, recirculation operating modes with the state of the additional devices.

The water distribution device 10 and the maintenance device 200 in which it is used enable a simplified and optimized management of the maintenance of the basin 100. In particular, the maintenance of said basin 100 could be automated.

By controlling all valves V1 to V5 or V6 and possibly the pump 1, the control unit 21 allows avoiding handling errors, for example the complete closure of the two pipes 15, 17 while the pump 1 is operating. Such a configuration causes a rise of pressure in the water inlet 3 and the pump 1 which might damage these elements.

Alternatively, management of the maintenance of the basin 100 may be managed by a specialist who also possess a terminal 23 allowing interacting with the control unit 21.

The maintenance may be performed in the form of a service, either by sending alerts to the user, or by sending a maintenance operator when an intervention on the basin 100 or the maintenance device 200 is necessary (filling tanks with maintenance products, breakdown, failure of a sensor, etc.).

The maintenance of the basin 100 could then be performed even in the absence of the user and continuously.

Furthermore, the user not being in physical contact with the valves and other elements of the maintenance device 200, the risk of accidental electrocution is reduced.

The invention claimed is:

1. A water distribution device for maintenance of a basin, in an artificial basin, comprising:
- a water inlet configured to be connected to a pump pumping water from the basin, first and second pipes, in parallel to one another and connected to the water inlet at one end,
- the first pipe being configured to be connected to a water discharge at the other end, and the second pipe being configured to be connected to a backflow leading into the basin,
- first and second connectors for a filter, configured to be connected to a filter filtering the water of the basin when water flows through said filter in a filtering direction and the flow of the water in a reverse direction reverse of the filtering direction causing rinsing of the filter, a first connector forming a filter inlet being disposed on the first pipe, between the water inlet and the water discharge, and a second connector forming a filter outlet being disposed on the second pipe, between the water inlet and the backflow,
- servovalves, and a control unit configured to actuate said valves, and, by actuating the valves, making water pumped from the basin selectively pass:
- from the water inlet to the first connector of the first pipe, and from the second connector of the second pipe towards the backflow in a filtering mode,
- from the water inlet to the second connector of the second pipe, and from the first connector towards the water discharge in a washing mode, and from the water inlet to the backflow without passing through the filter in a recirculation mode;
- wherein said water distribution device further includes a pipe bypassing the filter, which connects the first and second pipes in parallel with the filter, and in that it includes:
- a first valve between the water inlet and the first connector of the first pipe,
- a second valve between the first connector of the first pipe and the pipe bypassing the filter,
- a third valve between the water inlet and the second connector of the second pipe,
- a fourth valve at the second connector of the second pipe,
- a fifth valve at the pipe bypassing the filter,
- a sixth valve on the second pipe between the pipe bypassing the filter and the backflow.

2. The device according to claim 1, wherein the control unit is configured to permit, by actuating the valves, water pumped from the artificial basin pass: from the water inlet to the first connector of the first pipe, and from the second connector of the second pipe towards the water discharge in a rinsing mode.

3. The device according to claim 1 wherein the control unit is connected to a terminal having an interface, including at least one switch, the actuation of which causes toggling between different operating modes.

4. The device according to claim 3 wherein the control unit is connected to an antenna, configured to connect the control unit and the terminal, on which the switch is disposed.

5. The device according to claim 1 wherein the control unit is connected to a clock, and in that the control unit is programmable to automatically toggle between different operating modes at predetermined time points.

6. The device according to claim 5 wherein the control unit is configured to toggle between an automatic mode, in which toggling between different operating modes is automatic at predetermined time points, and a manual operating mode, in which toggling between different operating modes is managed by the actuation of the switch by a user.

7. The device according to claim 1 wherein the control unit is configured to execute toggle cycles between the different operating modes, with:
  an operation in the filtering mode for a first time period, then
  an operation in the washing mode for a second time period.

8. The device according to claim 7 wherein the control unit is configured to execute cycles further including an operation in a rinsing mode for a third time period after operation in the washing mode for a second time period.

* * * * *